United States Patent
Coppola et al.

(10) Patent No.: US 10,923,287 B1
(45) Date of Patent: Feb. 16, 2021

(54) VASCULAR COOLED CAPACITOR ASSEMBLY AND METHOD

(71) Applicant: GM GLOBAL TECHNOLOGY OPERATIONS LLC, Detroit, MI (US)

(72) Inventors: Anthony M. Coppola, Rochester Hills, MI (US); Alireza Fatemi, Canton, MI (US); Thomas W. Nehl, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 23 days.

(21) Appl. No.: 16/533,176

(22) Filed: Aug. 6, 2019

(51) Int. Cl.
| | | |
|---|---|---|
| *H01G 9/00* | (2006.01) | |
| *H01G 9/08* | (2006.01) | |
| *H01G 9/012* | (2006.01) | |
| *H01G 9/26* | (2006.01) | |

(52) U.S. Cl.
CPC .......... *H01G 9/0003* (2013.01); *H01G 9/012* (2013.01); *H01G 9/08* (2013.01); *H01G 9/26* (2013.01)

(58) Field of Classification Search
CPC .............................. H01G 9/0003; H01G 9/012
See application file for complete search history.

(56) References Cited

U.S. PATENT DOCUMENTS

| | | | |
|---|---|---|---|
| 2,492,747 A | 12/1949 | Herr et al. | |
| 2012/0139483 A1* | 6/2012 | Cottet | H05K 1/0295 |
| | | | 320/107 |
| 2013/0120910 A1* | 5/2013 | Watanabe | H01G 11/18 |
| | | | 361/517 |
| 2016/0066475 A1* | 3/2016 | Iskanius | H01G 11/12 |
| | | | 180/65.21 |
| 2016/0211086 A1* | 7/2016 | Pyzza | H01G 11/08 |
| 2017/0280563 A1* | 9/2017 | Vaillancourt | H01G 9/012 |
| 2019/0343007 A1* | 11/2019 | Sasaki | H01G 9/08 |

FOREIGN PATENT DOCUMENTS

| | | |
|---|---|---|
| EP | 1807849 B1 | 7/2007 |
| JP | 2007273774 A | 10/2007 |

* cited by examiner

*Primary Examiner* — Eric W Thomas
(74) *Attorney, Agent, or Firm* — Quinn IP Law

(57) ABSTRACT

A vascular cooled capacitor assembly includes a plurality of capacitors having respective first and second leads, first and second busbars disposed in electrical contact with the first and second leads, an encapsulant enveloping the capacitors and a respective major portion of each of the first and second busbars, and a network of channels enveloped within the encapsulant and formed by deflagration of a sacrificial material. The network has at least one network inlet and at least one network outlet, each of which is configured for sealable engagement with a cooling fluid system. A branch of each channel is positioned inside a central axial passage of a capacitor, around an outer periphery of a capacitor, and/or between two capacitors. A housing may enclose the capacitors, the channels and major portions of the first and second busbars.

20 Claims, 9 Drawing Sheets

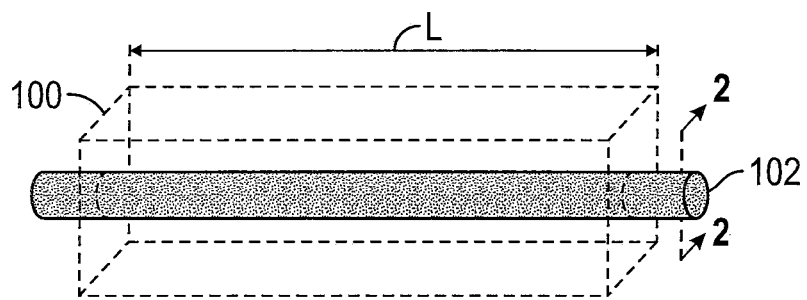
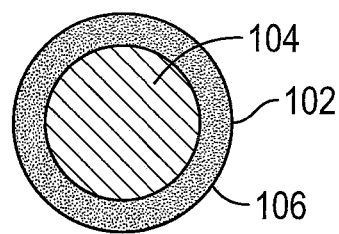
FIG. 17      FIG. 18
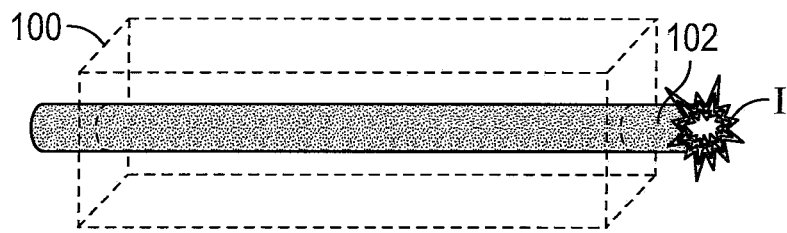
FIG. 19
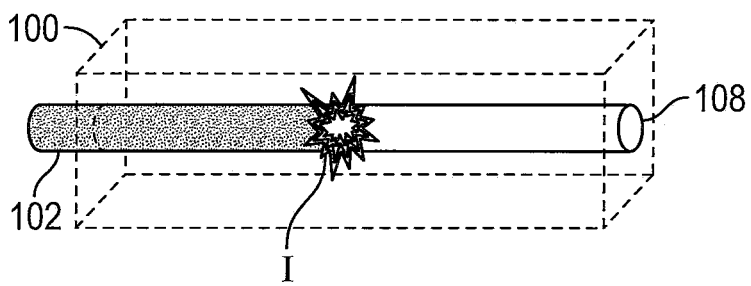
FIG. 20
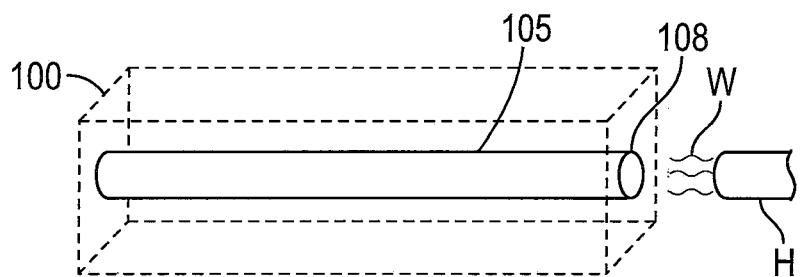
FIG. 21

US 10,923,287 B1

VASCULAR COOLED CAPACITOR ASSEMBLY AND METHOD

INTRODUCTION

This disclosure relates to vascular cooled capacitor assemblies and methods for making such assemblies.

Capacitors are temperature-sensitive and may experience challenges when used in environments having temperatures higher than the specified operating range of the capacitors. For example, capacitors may be used in traction inverter modules and other electronic modules where significant heat may be generated.

Solid electrolytic capacitors may be considered for such applications due to their relatively low cost and high capacitance per unit volume. However, their higher equivalent series resistance may limit their effective use in such applications as automotive traction power inverters. Providing larger electrical busbars may provide additional heat removal capacity, but adds size, mass and cost.

SUMMARY

According to one embodiment, a capacitor assembly configured for use with a cooling fluid system includes: a plurality of capacitors, each capacitor having respective first and second leads and a respective central axial passage extending along at least a portion of a respective axial length thereof; first and second busbars disposed in electrical contact with the first and second leads, respectively; an encapsulant enveloping the plurality of capacitors and a respective major portion of each of the first and second busbars; and a network of channels enveloped within the encapsulant and formed by deflagration of a sacrificial material. Each channel has a respective inlet end and a respective outlet end. The network has at least one network inlet configured to direct fluid flow into the inlet ends and at least one network outlet configured to direct fluid flow away from the outlet ends. At least one branch of each channel is positioned as being at least one of inside the central axial passage of at least one of the capacitors, around an outer periphery of at least one of the capacitors, and between at least two of the capacitors. Each of the at least one network inlet and the at least one network outlet is configured for sealable engagement with the cooling fluid system. The capacitor assembly may further include a housing enclosing the plurality of capacitors, the respective major portions of the first and second busbars, and the encapsulant.

The network of channels may be formed by forming a network of sacrificial components corresponding to the network of channels (the network of sacrificial components being positioned as at least one of within the encapsulant and on a surface of at least one of the first and second busbars), and igniting the sacrificial components to cause deflagration of the sacrificial components, thereby forming the network of channels.

The network may include at least one manifold, each of the at least one manifold having at least one respective first inlet/outlet port and at least one respective second inlet/outlet port in fluid communication with the at least one first inlet/outlet port, wherein each of the at least one first inlet/outlet port is configured for sealable engagement with the cooling fluid system, and wherein each of the at least one second inlet/outlet port is in fluid communication with one of the at least one inlet end and at least one outlet end.

Each channel may have a respective channel wall wherein a respective first portion of at least one channel wall is formed by the encapsulant. A second portion of the at least one channel wall may be formed by a respective surface of one of the first and second busbars.

The capacitor assembly may further include a respective tube disposed within the respective central axial passage of each capacitor. Each respective tube may be in fluid communication with the network of channels. The at least one branch may enter a respective central axial passage at a first respective end thereof and exit the respective central axial passage at one of the first respective end and a second respective end thereof.

The cooling fluid system may be an electronic module having a surface configured for mounting the capacitor assembly thereon, at least two cooling fluid interfaces on the surface, and a cooling fluid supply and return system in fluid communication with the at least two cooling fluid interfaces, wherein each of the at least one network inlet and the at least one network outlet is configured for sealable engagement with a respective one of the at least two cooling fluid interfaces.

According to one embodiment, a vascular cooled capacitor system includes: a plurality of capacitors, each capacitor having respective first and second leads and a respective central axial passage extending along at least a portion of a respective axial length thereof first and second busbars disposed in electrical contact with the first and second leads, respectively; a housing enclosing the plurality of capacitors and a respective major portion of each of the first and second busbars; an encapsulant filling at least a majority of free space within the housing; a network of channels formed by deflagration of a sacrificial material (each channel having a respective inlet end and a respective outlet end, the network having at least one network inlet configured to direct fluid flow into the inlet ends and at least one network outlet configured to direct fluid flow away from the outlet ends, wherein at least one branch of each channel is positioned as being at least one of inside the central axial passage of at least one of the capacitors, around an outer periphery of at least one of the capacitors, and between at least two of the capacitors); and a cooling fluid system having a surface onto which the housing is mounted, at least two cooling fluid interfaces on the surface, and a cooling fluid supply and return system in fluid communication with the two cooling fluid interfaces, wherein each of the at least one network inlet and the at least one network outlet is sealably engaged with a respective one of the at least two cooling fluid interfaces.

The network may include first and second manifolds each having at least one respective first inlet/outlet port and at least one respective second inlet/outlet port, each of the at least one first inlet/outlet port being sealably engaged with a respective one of the at least two cooling fluid interfaces, and each of the at least one second inlet/outlet port being in fluid communication with one of at least one inlet end and at least one outlet end. Each channel may have a respective channel wall wherein a respective first portion of at least one channel wall is formed by the encapsulant. A second portion of the at least one channel wall may be formed by a respective surface of one of the first and second busbars. The vascular cooled capacitor system may further include a respective tube disposed within the respective central axial passage of each capacitor, wherein the at least one branch enters a respective tube at a first respective end thereof and exits the respective tube at one of the first respective end and a second respective end thereof.

The above features and advantages, and other features and advantages, of the present teachings are readily apparent

BRIEF DESCRIPTION OF THE DRAWINGS

FIG. 17 is a schematic isometric view of a substrate molded to a sacrificial component.

FIG. 18 is a schematic sectional view of the sacrificial component, taken along section 2-2 of FIG. 17.

FIG. 19 is a schematic isometric view of the sacrificial component being ignited while still partly disposed inside the substrate.

FIG. 20 is a schematic isometric view depicting the deflagration of the sacrificial component in the substrate.

FIG. 21 is a schematic isometric view depicting a channel of the substrate being cleaned after the deflagration of the sacrificial component.

DETAILED DESCRIPTION

Figure 1:
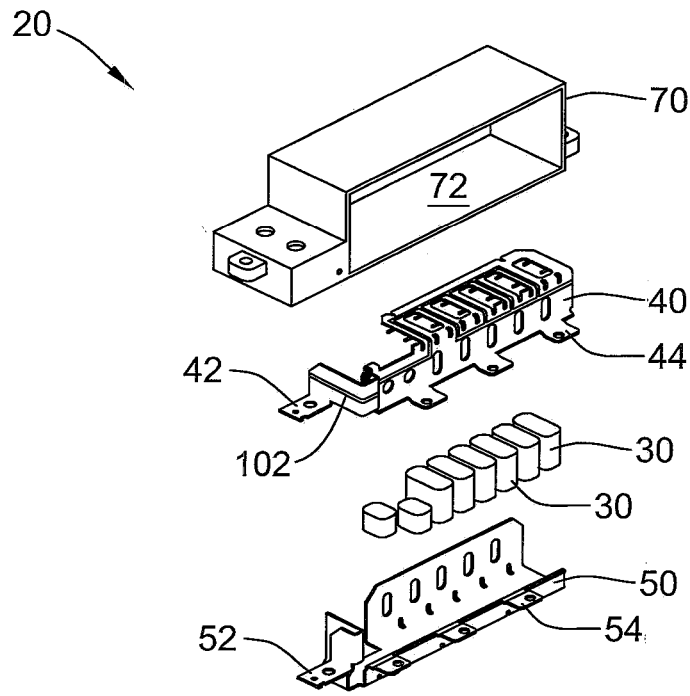
FIG. 1 is an exploded perspective view of a vascular cooled capacitor assembly.

Referring now to the drawings, wherein like numerals indicate like parts in the several views, a vascular cooled capacitor assembly/system 20 is shown and described herein. The description "vascular" is used herein to refer to a system of internal passages for the flow of fluid (i.e., cooling fluid), similar to the vascular or circulatory system of passages within the human body for the flow of blood.

FIG. 1 shows an exploded perspective view of an exemplary capacitor assembly 20 according to the present disclosure. The capacitor assembly 20 includes a plurality of capacitors 30, a first busbar 40, and a second busbar 50, all of which may be placed into a housing 70 whose interior free space 72 may be filled with an encapsulant 80. (As discussed below, alternative configurations of the capacitor assembly 20 may exclude the housing 70.) The two busbars 40, 50 represent separate "positive" and "negative" electrical busses for the capacitors 30. When the busbars 40, 50 are disposed within the interior 72 of the housing 70, their respective electrodes may protrude out through the housing so that they may be electrically connected to other devices. These electrodes may include end tabs 42 and side tabs 44 for the first busbar 40, and end tabs 52 and side tabs 54 for the second busbar 50.

Figure 15:
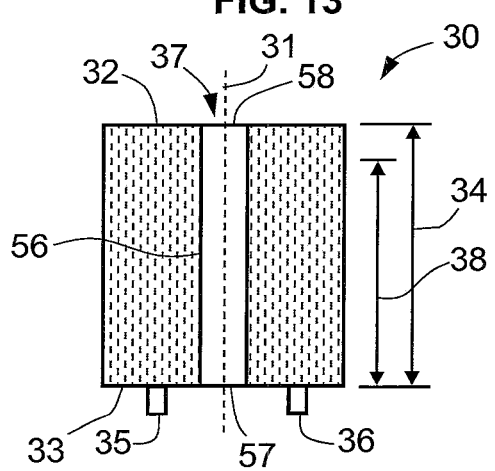
FIG. 15 is a schematic sectional side view of a capacitor.

FIG. 15 shows a schematic sectional side view of a representative capacitor 30. Each capacitor 30 has a first lead 35 and a second lead 36 (which are the electrical connections for the capacitor 30), as well as a central axial passage 37 extending along at least a portion 38 of a respective axial length 34 as measured along the longitudinal axis 31 of the capacitor 30. This length 34 may be measured from a first or "bottom" end 33 of the capacitor 30 (where the leads 35, 36 may be located) to a second or "top" end 32. The passage 37 may be formed when the various conductive and dielectric layers are rolled to form the capacitor 30. The passage 37 may extend through the entire length 34 of the capacitor 30; or, if the capacitor 30 is sealed or welded on one end 32 thereof, the central axial passage 37 may extend for a shorter length 38. When the capacitors 30 are situated in the housing 70, the first and second busbars 40, 50 are disposed so as to be in electrical contact with the first and second leads 35, 36, respectively.

With the capacitors 30 and busbars 40, 50 installed in the housing 70, an encapsulant 80 may be poured in so as to fill much (or all) of the interior free space 72 within the housing 70. The encapsulant 80 may be any suitable electrically insulative material, and it may envelope (i.e., enclose, contain, surround, etc.) the plurality of capacitors 30 and a respective major portion of each of the first and second busbars 40, 50, and may be heated or allowed to set in order to cure the electrically insulative encapsulant material 80. Alternatively, the housing 70 may be omitted, with the capacitors 30 and busbars 40, 50 being placed in a suitable mold and the encapsulant 80 being poured into the mold and cured.

In either configuration (i.e., with or without a housing 70), a network 108n of channels 108, formed by deflagration of a sacrificial material, is disposed and enveloped within the encapsulant 80. This network 108n of channels 108 may serve as a "vascular system" within the capacitor assembly 20, through which a cooling fluid may be circulated for cooling the plurality of capacitors 30. The network 108n of channels 108 may be formed by forming a network 110 of sacrificial components 102 made of combustible sacrificial material embedded in the encapsulant material 80 corresponding to a desired network 108$n$ of channels 108, and then (as explained in more detail below) igniting the sacrificial components 102 to cause deflagration of the sacrificial components 102, thereby producing the desired network 108$n$ of channels 108. The network 110 of sacrificial components 102 may be positioned (i.e., located and arrayed, spatially disposed, etc.) within the encapsulant material 80, on one or more surface(s) of one or both busbars 40, 50, or both within the encapsulant 80 and on one more busbar surface(s).

Figure 2:
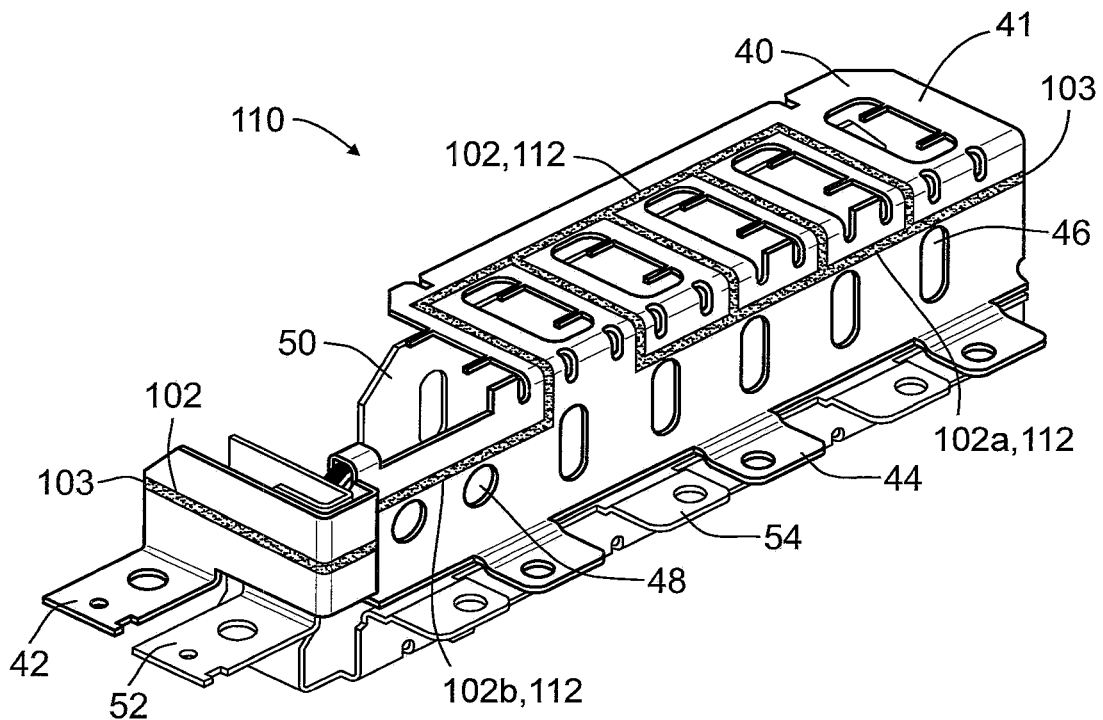
FIG. 2 is a perspective view of busbars for a vascular cooled capacitor assembly.

FIG. 2 shows an exemplary arrangement of busbars 40, 50 on which a network 110 of sacrificial components 102 is disposed. The network 110 is applied to a top surface 41 of a first busbar 40, and includes multiple filaments 102, 102$a$, 102$b$, 112. For example, filament 102$a$ is disposed on an outer side wall of the first busbar 40 so as to avoid the series of large oval holes 46, and filament 102$b$ lies on the same wall adjacent a series of small circular holes 48. The network 110 has two ends 103 as shown, which may serve as fluid flow inlets or outlets once the busbars 40, 50 have been encapsulated in encapsulant material 80 and the components 102 have been ignited and deflagrated to form the channels 108, as further described below.

Figure 3:
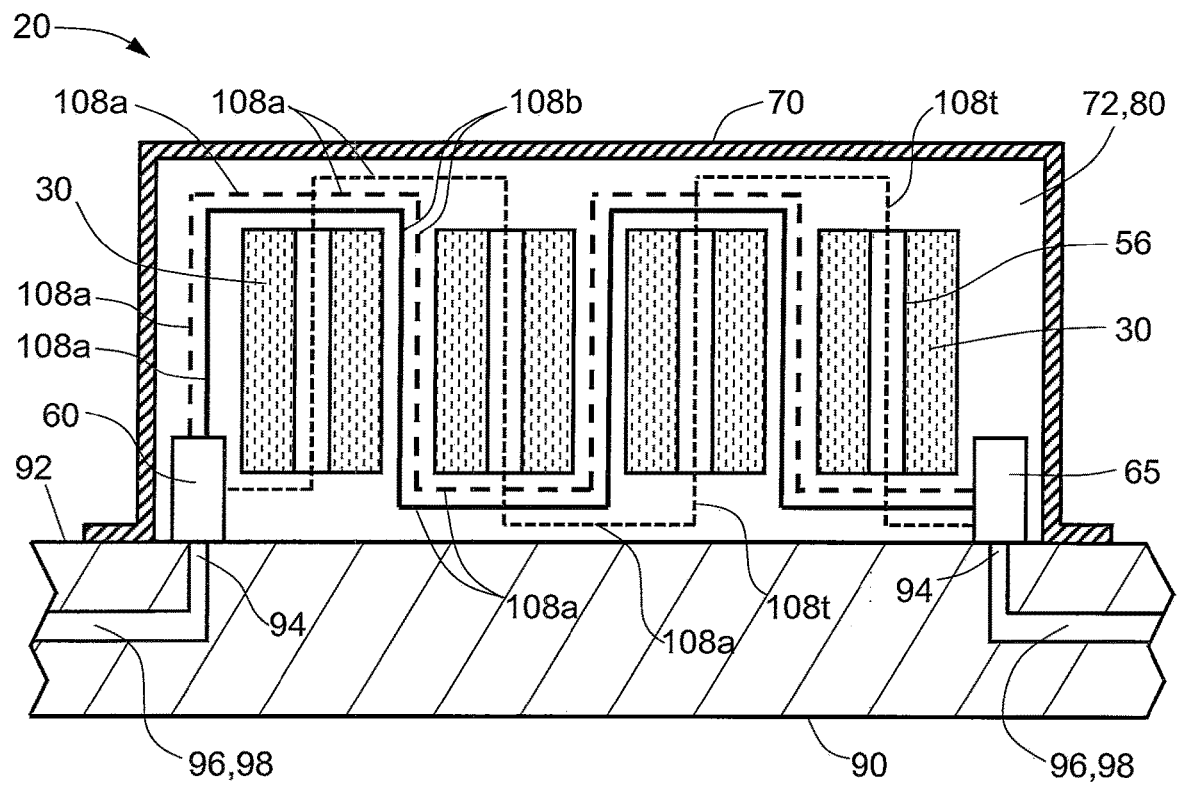
FIGS. 3-4 are schematic semi-sectional side views of a vascular cooled capacitor assembly, but with the busbars not shown.
Figure 4:
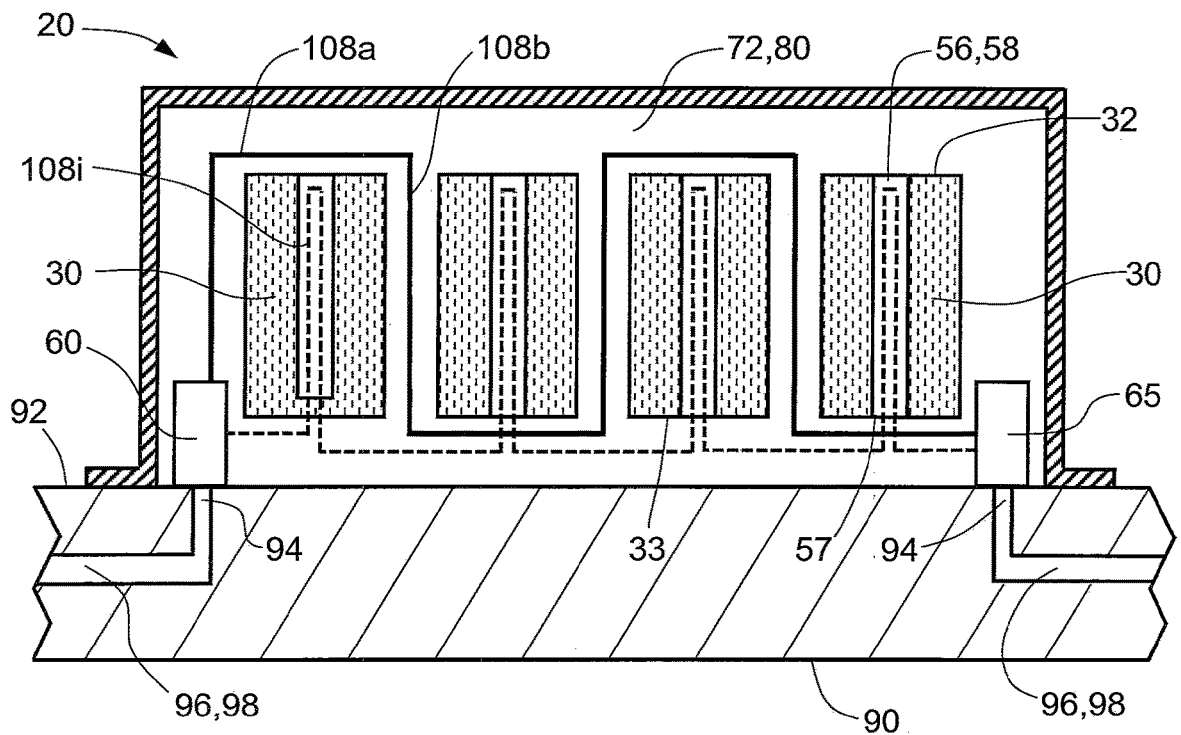

FIGS. 3-4 show schematic semi-sectional side views of two different configurations of a vascular cooled capacitor assembly 20, but with the busbars 40, 50 removed for purposes of illustration, and FIGS. 5-10 show schematic flow diagrams of various network 108$n$ and channel 108 configurations for a vascular cooled capacitor assembly 20. Each of the channels 108 has a respective inlet end 82 and a respective outlet end 84. The network 108$n$ has at least one network inlet 86 configured to direct fluid flow into the inlet ends 82 of the channels 108, and at least one network outlet 88 configured to direct fluid flow away from the outlet ends 84. At least one branch of each channel 108 is spatially disposed or positioned in at least one of the following three dispositions or locations within the capacitor assembly 20: (i) inside the central axial passage 37 of at least one of the capacitors 30, (ii) around an outer periphery of at least one of the capacitors 30, and (iii) between at least two of the capacitors 30. For example, in FIGS. 3-4, branches 108$i$ and 108$t$ run inside the central axial passage(s) 37 of one or more capacitors 30, branch 108$a$ runs around the outer periphery (-ies) of one or more capacitors 30, and branch 108$b$ runs between at least two capacitors 30.

Each of the at least one network inlet 86 and the at least one network outlet 88 is configured for sealable engagement with a cooling fluid system 90, which may be external to the capacitor assembly 20. (Alternatively, the capacitor assembly/system 20 may include the cooling fluid system 90.) The cooling fluid system 90 may be an electronic module (e.g., a power module, a control module, etc.) having a surface 92 configured for mounting the capacitor assembly 20 thereon. The cooling fluid system 90 may have two or more cooling fluid interfaces 94 on the surface 92, and a cooling fluid supply and return system 96 in fluid communication with the cooling fluid interfaces 94. Each of the cooling fluid interfaces 94 may be connected to the cooling fluid supply and return system 96 via fluid channels 98 that are internal to the module 90. Each of the at least one network inlet 86 and each of the at least one network outlet 88 is configured for sealable engagement with a respective one of the two cooling fluid interfaces 94, such as by the use of suitable fluid fittings or connectors. When the capacitor assembly 20 is sealably connected with the electronic module/cooling fluid system 90, the cooling fluid provided by the cooling fluid supply and return system 96 may circulate through the network 108$n$ of channels 108 (i.e., the vascular system of the capacitor assembly 20), thereby providing cooling to the plurality of capacitors 30.

Figure 5:
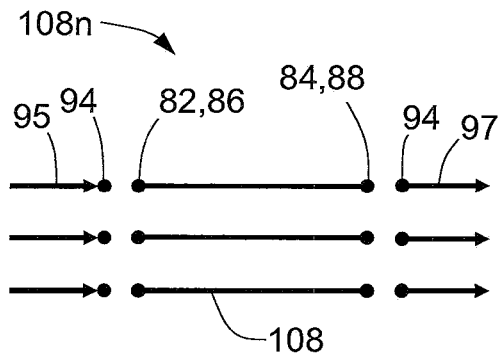
FIGS. 5-10 are schematic flow diagrams of various network/channel configurations for a vascular cooled capacitor assembly.
Figure 6:
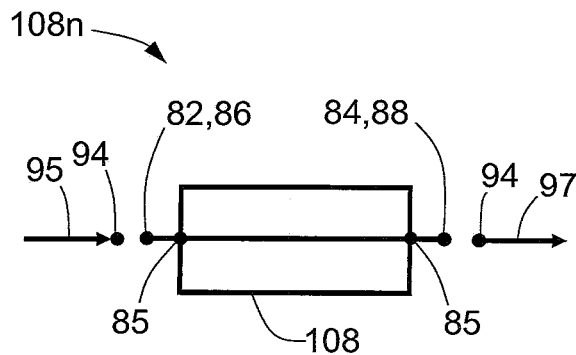
Figure 7:
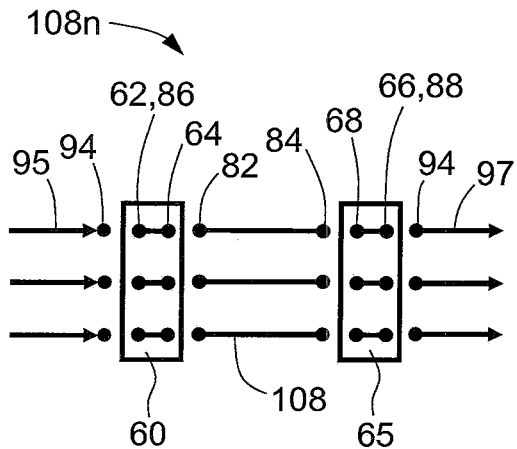
Figure 8:
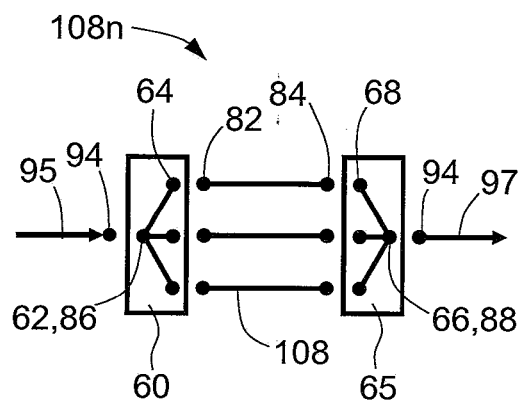
Figure 9:
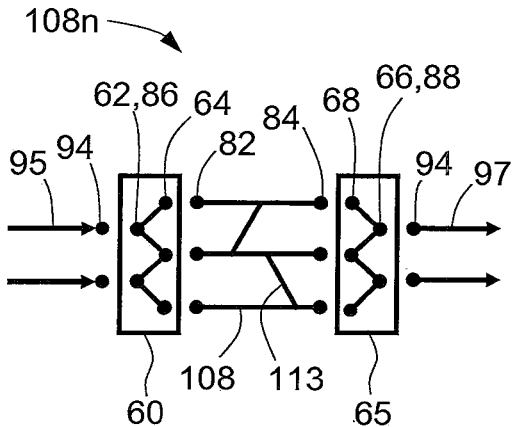
Figure 10:
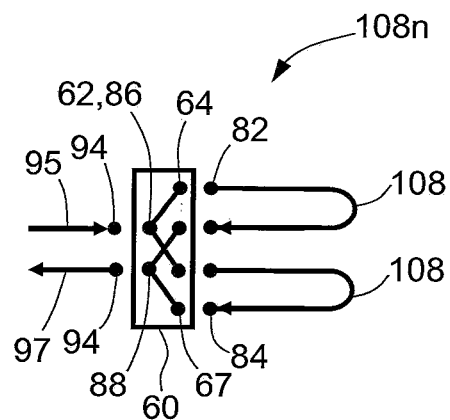
Figure 11:
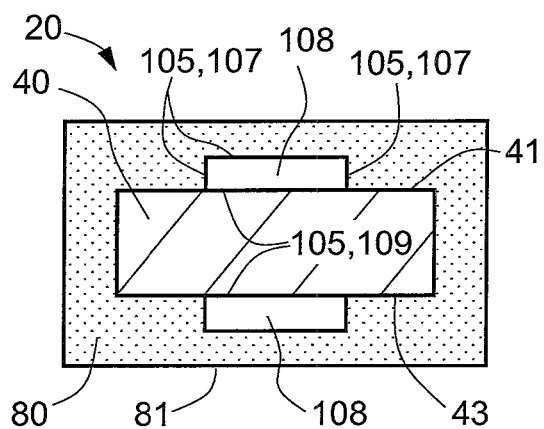
FIGS. 11-14 are schematic sectional side views of various configurations of a vascular cooled capacitor assembly, but with the capacitors not shown.
Figure 12:
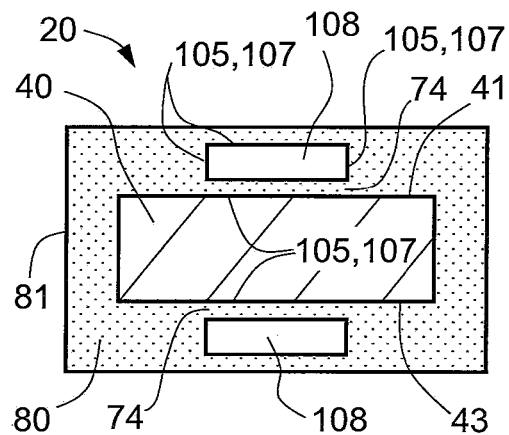

FIGS. 5-10 show several exemplary network/channel flow diagrams for a vascular cooled capacitor assembly 20. FIGS. 5-7 show examples without the use of a manifold, while FIGS. 8-10 illustrate examples with one or two manifolds 60, 65. Each example includes a network 108$n$ of two or more channels 108, which may be interconnected (as in FIGS. 6 and 9) or not. Each individual channel 108 has an inlet end 82 and an outlet end 84, and each collection or network 108$n$ of channels 108 has one or more network inlets 86 and one or more network outlets 88. For example, the network 108$n$ shown in FIG. 5 has three non-interconnected channels 108, so that network 108$n$ would have three inlet ends 82, three outlet ends 84, three network inlets 86 and three network outlets 88, wherein each inlet end 82 is also a network inlet 86 and each outlet end 84 is also a network outlet 88. In contrast, the network 108$n$ shown in FIG. 6 has three interconnected channels 108 which converge at two convergence nodes 85; this network 108$n$ would have one inlet end 82, one outlet end 84, one network inlet 86 and one network outlet 88, wherein each inlet end 82 is also a network inlet 86 and each outlet end 84 is also a network outlet 88. (Note that the three channels 108 shown in FIG. 9 are interconnected by two crossover or connecting branches 113.) Each of the examples shown in FIGS. 5-10 also includes at least one supply 95 of cooling fluid (which may come from a cooling fluid system/module 90) and at least one return 97 for the cooling fluid. A cooling fluid interface 94 (such as an adapter or connector) is provided for each supply 95 and return 97, and each network inlet 86 and network outlet 88 is configured to sealably engage with a respective cooling fluid interface 94.

FIGS. 7-10 illustrate networks 108$n$ having at least one manifold 60, 65 which may be used for directing cooling fluid flow between the cooling fluid system 90 and the network 108$n$ of channels 108. Each manifold 60, 65 has at least one respective first inlet/outlet (I/O) port 62, 66 and at least one respective second I/O port 64, 68 in fluid communication with at least one of the at least one first I/O port 62, 66. Each first I/O port 62, 66 is configured for sealable engagement with the cooling fluid system 90 (such as with a supply 95 or return 97, via a suitable connector or coupling 94), and each second I/O port 64, 68 is in fluid communication with one or more channel inlet ends 82 or one or more channel outlet ends 84. In other words, each manifold 60, 65 is configured to couple the network 108$n$ with one or more elements external to the network 108$n$. More specifically, the first I/O ports 62, 66 may be configured for engagement with elements external to the network 108$n$ (e.g., the supply 95 and return 97), while the second I/O ports 64, 68 may be configured for engagement with elements internal to the network 108$n$ (e.g., the channels 108). When two or more manifolds 60, 65 are used as part of a capacitor assembly 20—such as in FIGS. 7-9 where a first manifold 60 is provided for the inlet side and a second manifold 65 for the outlet side—each first I/O port 62, 66 may serve as either a network inlet 86 or a network outlet 88. For example, each first I/O port 62 for the first manifold 60 may serve as a network inlet 86, and each first I/O port 66 for the second manifold 65 may serve as a network outlet 88. When one manifold 60 is used—such as in FIG. 10—the first I/O port 62 may serve as a network inlet 86 (connecting to a cooling fluid supply 95), the second I/O port 64 may connect with the channels 108, and a third I/O port 67 may serve as a network outlet 88 (connecting to a cooling fluid return 97).

FIGS. 11-14 show schematic sectional side views of various configurations of a vascular cooled capacitor assembly 20 without a housing 70, but with the capacitors 30 not shown for the purposes of illustration. Each channel 108 has one or more channel walls 105. For example, a channel 108 having a circular cross-section has one circumferential channel wall 105, while a channel 108 having a rectangular cross-section has four channel walls 105. A first portion 107 of at least one channel wall 105 is formed by the encapsulant 80, while a second portion 109 of the at least one channel wall 105 may be formed by a respective surface of one of the first and second busbars 40, 50. For example, in FIG. 11, two rectangular channels 108 are shown, with each having four channel walls 105, and with the channels 108 disposed with one of its respective walls 109 in contact with the busbar 40. Each of these two channels 108 has three walls 107 formed by the encapsulant material 80, and one wall 109 formed by a surface 41, 43 of the first busbar 40. In this case, the first portion 107 and the three encapsulant-formed walls 107 are synonymous with each other, while the second portion 109 and the one busbar surface-formed wall 109 are also synonymous with each other. In contrast, in FIG. 12 the channels 108 appear to be "floating" in the encapsulant 80 with no channel walls 105 in contact with the busbar 40; in fact, there is a gap 74 or spacing between each surface 41, 43 of the busbar 40 and its adjacent channel 108, and this gap 74 is filled with encapsulant 80, such that the encapsulant 80 forms all four of the channel walls 105, 107. For any given channel 108, the entire length and circumference/perimeter thereof may be either fully encapsulated (like in FIG. 12) or partially/mostly encapsulated but in contact with a busbar surface 41, 43 (like in FIG. 11); or, the degree of encapsulation may vary along the length and/or circumference/perimeter of the channel 108.

Figure 13:
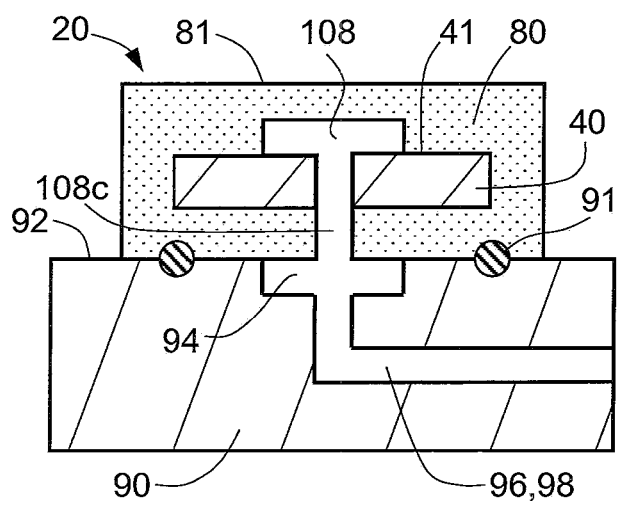
Figure 14:
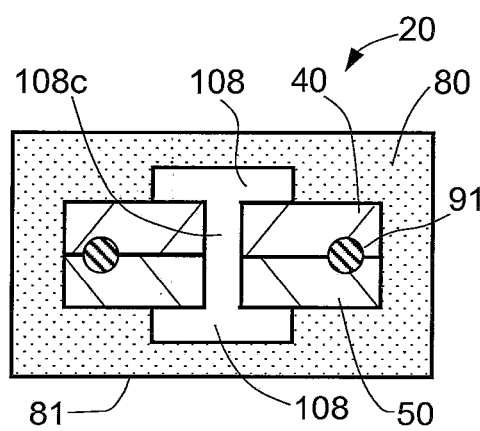

FIGS. 13-14 show two capacitor assemblies 20 where a hole may be formed through a busbar 40 so that a connecting channel 108c may be formed through the hole. For example, a bolt (not shown) with a central axial hole through its length may be used to fasten the busbar 40 to a module/cooling fluid system 90, such that cooling fluid may run through the hole formed in the bolt. Gaskets or o-rings 91 may be used to seal the encapsulated capacitor assembly 20 when it is fastened to the cooling fluid system/module 90. FIG. 14 illustrates how two or more busbars 40, 50 may be stacked and fastened together with a hole and connecting channel 108c running through both busbars 40, 50.

Figure 16:
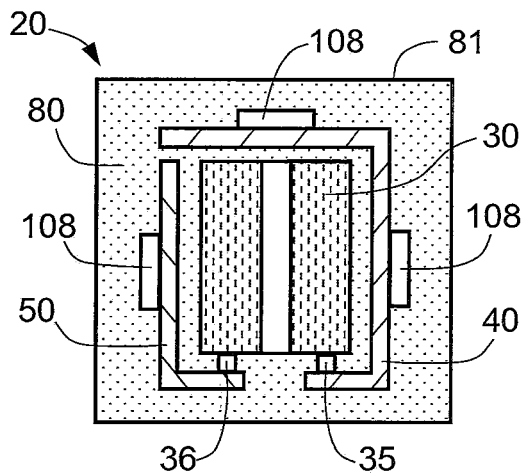
FIG. 16 is a schematic sectional side view of a vascular cooled capacitor assembly.

FIG. 16 shows a schematic sectional side view of a vascular cooled capacitor assembly 20. As with the configurations shown in FIGS. 11-14, a housing 70 is not shown; instead, the capacitor assembly 20 is shown encapsulated or enveloped by the encapsulant 80, forming an outer surface or envelope 81 around the capacitors 30, busbars 40, 50 and channels 108. As illustrated by FIG. 16, a capacitor assembly 20 may include: a plurality of capacitors 30, with each capacitor 30 having respective first and second leads 35, 36 and a respective central axial passage 37 extending along at least a portion 38 of a respective axial length 34 thereof; first and second busbars 40, 50 disposed in electrical contact with the first and second leads 35, 36, respectively; an encapsulant 80 enveloping the plurality of capacitors 30 and a respective major portion of each of the first and second busbars 40, 50; and a network 108n of channels 108 enveloped within the encapsulant 80 and formed by deflagration of a sacrificial material, each channel 108 having a respective inlet end 82 and a respective outlet end 84, the network 108n having at least one network inlet 86 configured to direct fluid flow into the inlet ends 82 and at least one network outlet 88 configured to direct fluid flow away from the outlet ends 84, wherein at least one branch of each channel 108 is positioned (i) inside the central axial passage 37 of at least one of the capacitors 30 (i.e., branch 108i or 108t), (ii) around an outer periphery of at least one of the capacitors 30 (i.e., branch 108a), and/or (iii) between at least two of the capacitors 30 (i.e., branch 108b), and wherein each of the at least one network inlet 86 and the at least one network outlet 88 is configured for sealable engagement with a cooling fluid system 90. The capacitor assembly 20 may further include a housing 70 enclosing the plurality of capacitors 30, the respective major portions of the first and second busbars 40, 50, and the encapsulant 80.

As shown in FIGS. 3, 4 and 15, the capacitor assembly 20 may further include a respective tube 56 disposed within the respective central axial passage 37 of each capacitor 30. This tube 56 may be made of a polymer or an insulator-coated metal, and may be added to each capacitor 30 as part of the fabrication process, such as by using the tube 56 as a mandrel onto which the conductive and dielectric layers may be rolled to form the capacitor 30. The tube 56 may have a first or bottom end 57 aligned with the first or bottom end 33 of the capacitor, and a second or top end 58 aligned with the second or top end 32 of the capacitor 30. Or, the tube 56 may be formed of sacrificial material similar to the network 110 of filaments 112, and the tube filament 112 may be deflagrated to form the tube 56. Each respective tube 56 may be in fluid communication with the network 108n of channels 108, such that cooling fluid may pass into/through each capacitor 30. If the tube 56 extends through the full axial length 34 of the capacitor 30, then a channel 108 may pass through the tube 56 and serve as a "through" branch 108t (see FIG. 3), but if the tube 56 only extends a portion 38 of the axial length 34, then a channel 108 may enter and exit one side 57 the tube 56 and may serve as an "in-and-out" branch 108i (see FIG. 4).

The vascular system or network 108n of channels 108 according to the present disclosure is effective for providing cooling to capacitors 30 and/or busbars 40, 50, such as may be used in capacitor assemblies 20 in hybrid automotive vehicles, power systems, and the like. By taking advantage of the cooling provided, designers may utilize different (and more optimal) sizes and arrangements of capacitors 30 and/or busbars 40, 50 for a given package size.

The process of forming the network 108n of channels 108 will now be discussed in more detail. With reference to FIG. 17, the present disclosure describes a method of forming channels 108 within or on a substrate 100 using deflagration of a sacrificial material. The substrate 100 may be an encapsulant 80 as described above, and/or the substrate may be a busbar 40, 50, with the channels 108 formed within the encapsulant 80 and/or on the busbar surface(s) 41, 43. In this method, a sacrificial component 102 may be molded directly into/onto the substrate 100 as shown in FIG. 17. For example, the sacrificial component 102 may be molded directly into/onto the substrate 100 such that the sacrificial component 102 is disposed inside of or on a surface of the substrate 100. For instance, after molding, a majority of the sacrificial component 102 may be entirely disposed inside the substrate 100 to facilitate the formation of thru-holes. However, at least part of the sacrificial component 102 should be disposed outside of the substrate 100 to allow it to be ignited as discussed below.

With reference to FIG. 18, the sacrificial component 102 may include a combustible core 104 and an optional protective shell 106 surrounding the combustible core 104. The combustible core 104 allows for rapid deflagration but not detonation. The heat generated during deflagration is dissipated rapidly enough to prevent damage to the substrate 100. After deflagration, the combustible core 104 may generate easy-to-remove byproducts, such as fine powdered and large gaseous components. It is contemplated that the combustible core 104 may be self-oxidizing to burn in a small diameter along long channels. The combustible core 104 may also be resistant to molding pressures. Further, the combustible core 104 may be shelf stable and stable during manufacturing (i.e., the flash point is greater than the manufacturing or processing temperature). The term "flash point" means the lowest temperature at which vapors of a combustible material will ignite, when given an ignition source. The sacrificial component 102 may be molded directly to the substrate 100 at a processing temperature that is less than the flash point of the combustible material to avoid deflagration during the manufacturing process. The term "processing temperature" means a temperature required to perform a manufacturing operation, such as molding or casting. For example, the processing temperature may be the melting temperature of the material forming the substrate 100 (i.e., the melting temperature of the polymeric resin forming the substrate 100). The combustible core 104 is wholly or partly made of a combustible material. To achieve the desired properties mentioned above, the combustible material may be black powder (i.e., a mixture of sulfur, charcoal, and potassium nitrate). To achieve the desired properties mentioned above, the combustible material may alternatively or additionally be pentaerythritol tetranitrate, combustible metals, combustible oxides, thermites, nitrocellulose, pyrocellulose, flash powders, and/or smokeless powder. Non-combustible materials could be added to the combustible core 104 to tune speed and heat generation. To tune speed and heat generation, suitable non-combustible materials for the combustible core 104 include, but are not limited to, glass beads, glass bubbles, and/or polymer particles.

The optional protective shell 106 may be made of a protective material, which may be non-soluble material in combustible resin (e.g., epoxy, polyurethane, polyester, among others) in order to be shelf stable and stable during manufacturing. Also, this protective material may be impermeable to resin and moisture. The protective material may have sufficient structural stability to be integrated into a fiber textiling and preforming process. The protective material may have sufficient strength and flexibility to survive the fiber preform process. To achieve the desirable properties mentioned above, the protective material may include, for example, braided fibrous material, such as glass fiber, aramid fiber, carbon fiber, and/or natural fiber, infused with an infusion material such as a polymer or wax, oil, a combination thereof or similar material. To achieve the desirable properties mentioned above, the infused polymer may be, for example, polyimide, polytetrafluoroethylene (PTFE), high-density polyethylene (HDPE), polyphenylene sulfide (PPS), polyphthalamide (PPA), polyamides (PA), polypropylene, nitrocellulose, phenolic, polyester, epoxy, polylactic acid, bismaleimides, silicone, acrylonitrile butadiene styrene, polyethylene, polycarbonate, elastomers, polyurethane, polyvinylidene chloride (PVDC), polyvinyl chloride (PVC), polystyrene (PS) a combination thereof, or any other suitable plastic. Suitable elastomers include, but are not limited to, natural polyisoprene, synthetic polyisoprene, polybutadiene (BR), chloroprene rubber (CR), butyl rubber, styrene-butadiene rubber, nitrile rubber, ethylene propylene rubber, epichlorohydrin rubber (ECO), polyacrylic rubber, fluorosilicone rubber, perfluoroelastomers, polyether block amides, chlorosulfonated polyethylene, ethylene-vinyl acetate, shellac resin, nitrocellulose lacquer, epoxy resin, alkyd, polyurethane, etc.

With reference to FIG. 19, after molding the sacrificial component 102 directly to the substrate 100, the sacrificial component 102 is ignited. To do so, a flame may be placed in direct contact with the sacrificial component 102 to cause an ignition I. A lighter or any device capable of producing a flame can be used to ignite the sacrificial component 102.

With reference to FIG. 20, the ignition I causes deflagration of the sacrificial component 102. Deflagration converts the solid sacrificial material into gaseous and fine powder byproducts. As a consequence, a channel 108 is formed in/on the substrate 100. The sacrificial component 102 may be cylindrical in order to form the channel 108 with a cylindrical shape. The sacrificial component 102 may alternatively have other shapes, such as triangular, elliptical, rectangular, etc. Further, before ignition I, the sacrificial component 102 may extend through the entire length L (FIG. 17) of the substrate 100 or substrate perimeter such that, after deflagration, the channel 108 extends through the entire length L (FIG. 17) of the substrate 100.

With reference to FIG. 21, after deflagration, the channel 108 may optionally be cleaned to remove byproducts of the deflagration of the sacrificial component 102. To do so, a liquid W, such as water, may be introduced into the channel 108 of the substrate 100 to remove byproducts of the deflagration of the sacrificial component 102. A hose H may be used to introduce the liquid W into the channel 108. A gas, such as air, may alternatively or additionally may be shot into the channel 108 to remove byproducts of the deflagration of the sacrificial component 102. Or, the channel 108 may not need any cleaning of byproducts.

Figure 22:
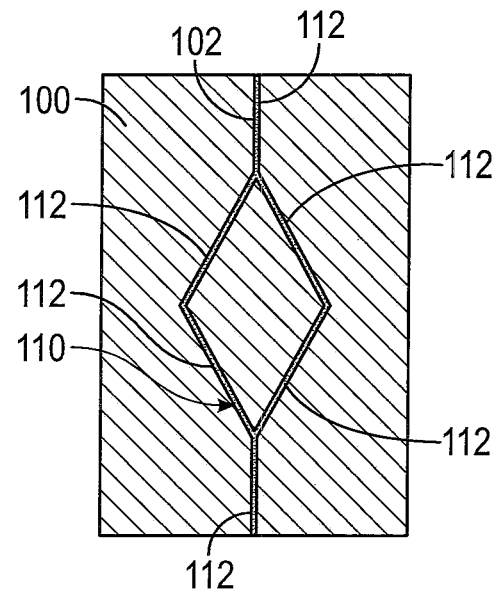
FIG. 22 is a schematic sectional view of a substrate molded to a sacrificial component, wherein the sacrificial component includes intersecting filaments.
Figure 23:
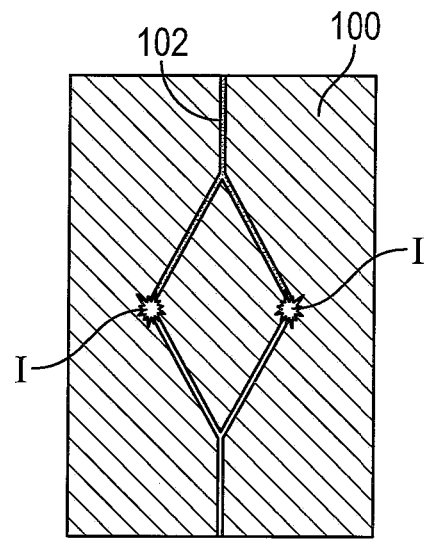
FIG. 23 is a schematic sectional view of the substrate shown in FIG. 22, while the sacrificial component is being ignited.
Figure 24:
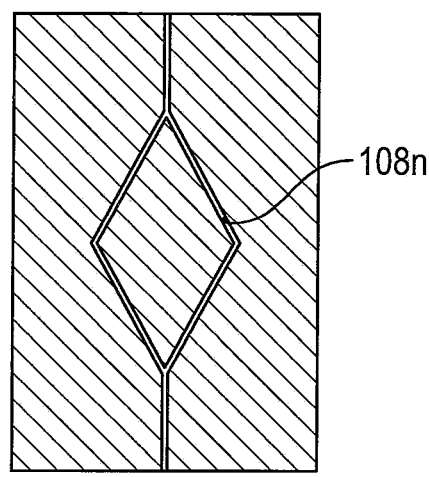
FIG. 24 is a schematic sectional view of the substrate shown in FIG. 23, depicting the breached channel after the sacrificial component has been ignited.

With reference to FIGS. 22-24, the method described above can be used to provide the substrate 100 with a branched channel-network 108n (FIG. 24). Accordingly, the method shown in FIGS. 22-24 is substantially similar to the method described above with respect to FIGS. 17-21, except for the differences described below. In this method, the sacrificial component 102 is also molded directly into/onto the substrate 100, but the sacrificial component 102 is configured as a network 110 including filaments 112 which may intersect each other or otherwise branch off from one another. After molding the sacrificial component 102 to the substrate 100, the sacrificial component 102 is ignited as described above to cause deflagration of the sacrificial component 102 as shown in FIG. 23, thereby producing the substrate 100 with the branched channel-network 108n as shown in FIG. 24.

Figure 25:
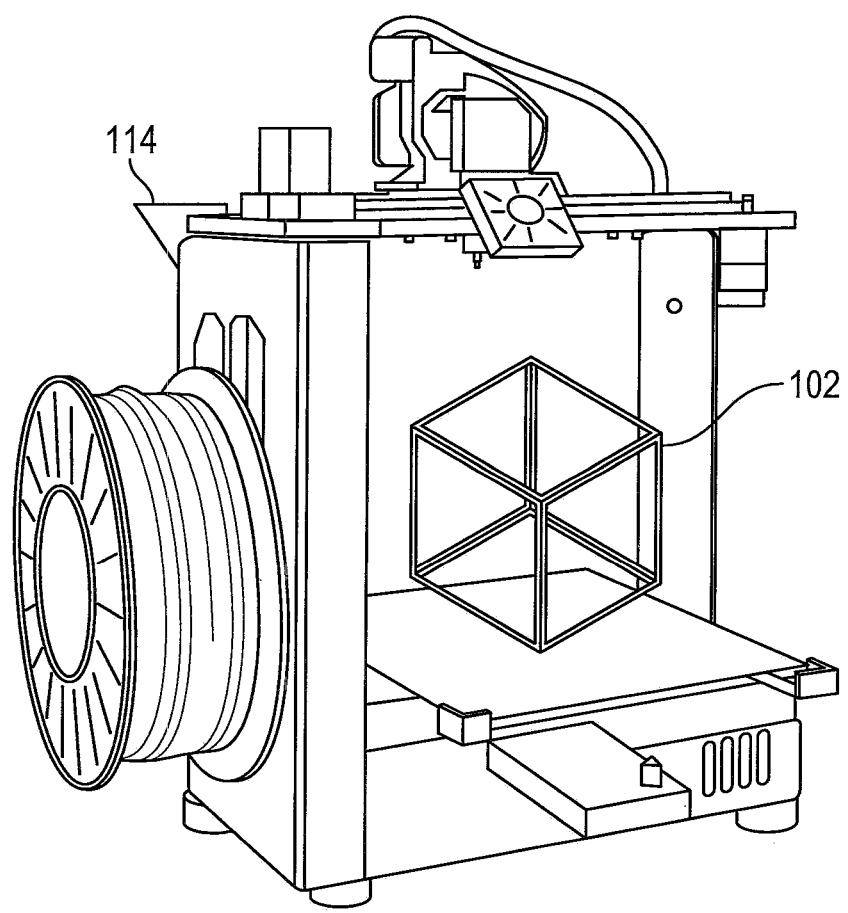
FIG. 25 is a schematic isometric view of a 3D printer creating a sacrificial component.
Figure 26:
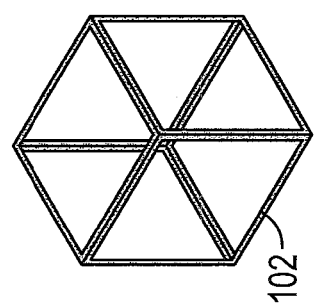
FIG. 26 is a schematic isometric view of a sacrificial component.
Figure 27:
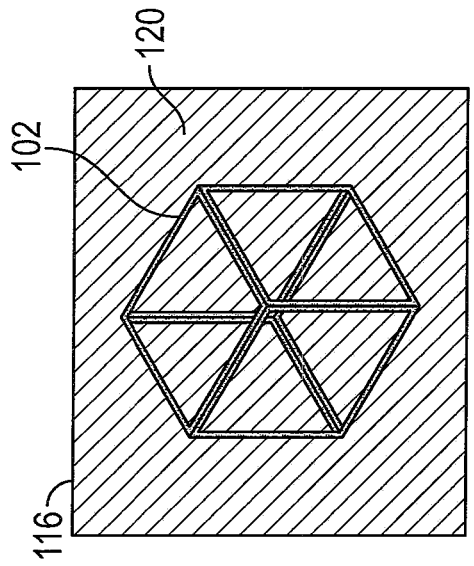
FIG. 27 is a schematic front view of the sacrificial component of FIG. 26 inside a mold.

With reference to FIG. 25, any of the methods described herein may further include forming the sacrificial component 102 using an additive manufacturing process to allow the formation of sacrificial component 102 with complex shapes. In the present disclosure, the term "additive manufacturing process" means a process in which a 3D object is built by adding layer-upon-layer of material. 3D printing process is a kind of additive manufacturing process. In the present disclosure, the term "3D printing process" means a process in which a 3D Computer Aided Design (CAD) model is read by a computer, and the computer commands the 3D printer 114 to add successive layers of material to create a 3D object that corresponds to the 3D CAD model. The sacrificial component 102 may use a 3D printing process (by employing the 3D printer 114) to create sacrificial components 102 with complex shapes. Accordingly, substrates 100 with channels 108 having complex shapes can be created. In this method, the sacrificial component 102 can be wholly or partly made, for example, of commercial 3D printing sugar and/or the rocket propellant known as Rocket Candy. One or both busbars 40, 50 and/or partially encapsulated portions of a capacitor assembly 20 may be placed into the 3D printing machine 114, and the sacrificial components 102 3D printed thereon.

Figure 28:
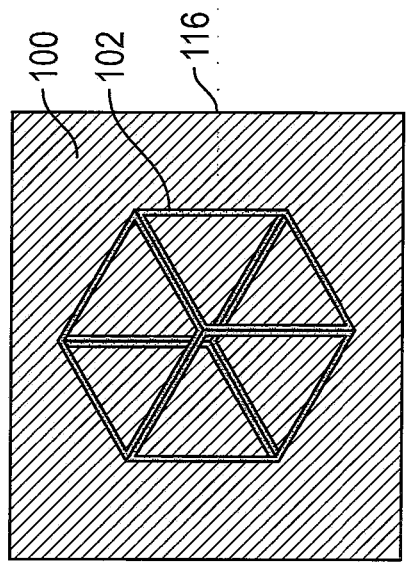
FIG. 28 is a schematic front view of the sacrificial component of FIG. 26 inside the mold, wherein resin or metal has been poured in the mold.
Figure 29:
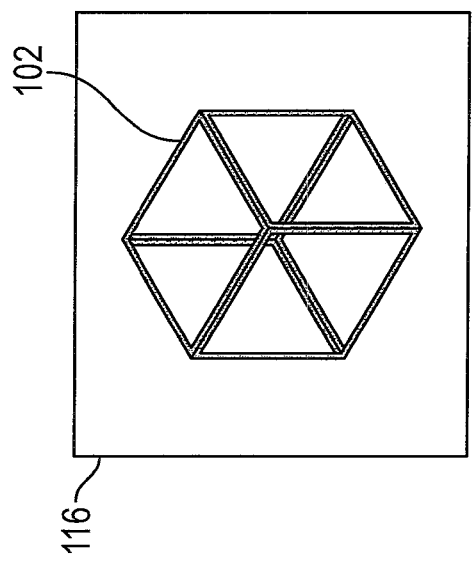
FIG. 29 is a schematic front view of the sacrificial component of FIG. 26 inside the mold after the resin has been cured or the metal has been cooled.
Figure 30:
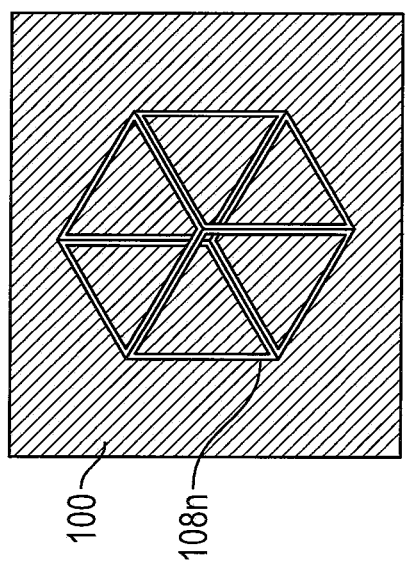
FIG. 30 is a schematic front view of the substrate after removing the sacrificial component.

With reference to FIGS. 26-30, any of the methods described herein may entail first forming the sacrificial component 102 as described above. In order to achieve a complex shape, the sacrificial component 102 may be created using the 3D printing process described above. Then, the sacrificial component 102, busbars 40, 50, and/or partially encapsulated portion of the capacitor assembly 20 may be placed inside a mold 116 as shown in FIG. 24. Next, a resin or liquid metallic material 120 is poured in the mold 116 as shown in FIG. 28. Then, the resin is cured (through, for example, heating for a predetermined amount of time at a predetermined curing temperature) or the metallic material is cooled (for a predetermined amount of time) to form the substrate 100. The metallic material 120 is cooled until it solidifies to form the substrate 100 as shown in FIG. 29. Next, the sacrificial component 102 and the substrate 100 are removed from the mold 116, and then the sacrificial component 102 is removed (through deflagration as described above) as shown in FIG. 30. By employing this process, substrates 100 with a branched channel-network 108n having a complex shape can be created with low-pressure cast materials, such as low-temperature metals and polymers.

Figure 31:
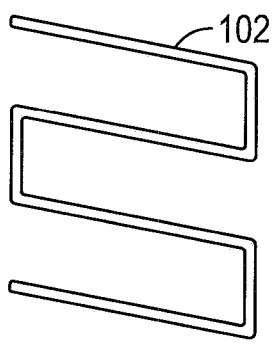
FIG. 31 is a schematic front view of a sacrificial component formed using 3D printing.
Figure 32:
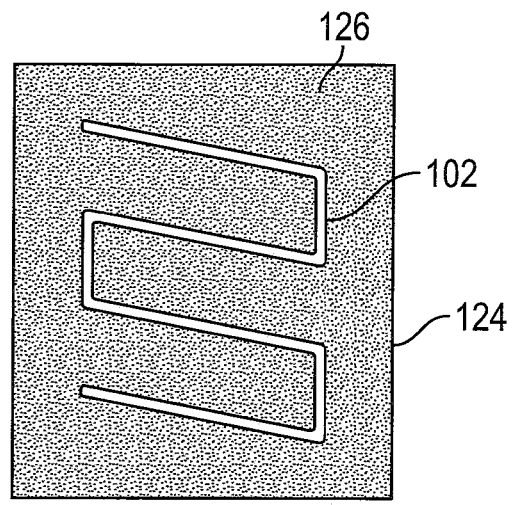
FIG. 32 is a schematic front view of the sacrificial component of FIG. 31 being dip coated.
Figure 33:
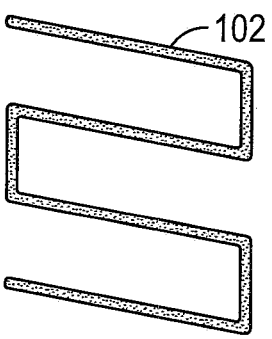
FIG. 33 is a schematic front view of the sacrificial component of FIG. 31 after being dip coated.
Figure 34:
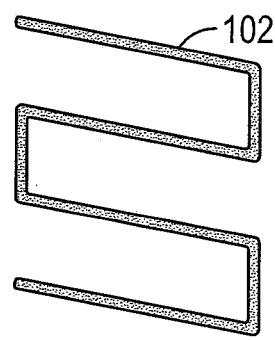
FIG. 34 is a schematic front view of the sacrificial component of FIG. 31 while the coating is being cured.
Figure 35:
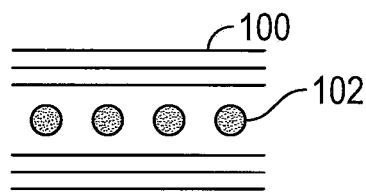
FIG. 35 is a schematic front view of the sacrificial component (after being dip coated and cured) and placed in a substrate.

With reference to FIGS. 31-35, the sacrificial component 102 may be formed using a 3D printing process as described below (see FIG. 31). Then, the sacrificial component 102 may be coated with a coat 126 (see FIG. 32). For example, the sacrificial component 102 may be dipped in a container 124 holding the coat 126. In other words, the sacrificial component 102 may be dip coated. The coat 126 may be wholly or partly made of a coating material. The modulus of resilience of the coating material (i.e., the first modulus of resilience) may be greater than the modulus of resilience of the combustible material of the sacrificial component 102 (i.e., the second modulus of resilience) in order to enhance the durability of the sacrificial material 102 during the manufacturing process. For example, the coating material may be a toughened epoxy. Because of its resilience, the coat 126 allows the sacrificial component 102 to be used in higher pressure manufacturing, such as for continuous fiber composites. After dip coating the sacrificial component 102, the sacrificial component 102 is removed from the container 124 as shown in FIG. 34. Then, the coat 126 is cured (through, for example, heating at a curing temperature for a predetermined curing time) as shown in FIG. 35. Next, the sacrificial component 102 (with the coat 126) may be embedded in/onto the substrate 100 (through molding as described above).

The above description is intended to be illustrative, and not restrictive. While various specific embodiments have been presented, those skilled in the art will recognize that the disclosure can be practiced with various modifications within the spirit and scope of the claims. While the dimensions and types of materials described herein are intended to be illustrative, they are by no means limiting and are exemplary embodiments. Moreover, in the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" should be understood to mean "only A, only B, or both A and B." Furthermore, references to a particular embodiment or example are not intended to be interpreted as excluding the existence of additional embodiments or examples that also incorporate the recited features. Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely".

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A capacitor assembly configured for use with a cooling fluid system, comprising:
   a plurality of capacitors, each capacitor having respective first and second leads and a respective central axial passage extending along at least a portion of a respective axial length thereof;
   first and second busbars disposed in electrical contact with the first and second leads, respectively;
   an encapsulant enveloping the plurality of capacitors and a respective major portion of each of the first and second busbars; and
   a network of channels enveloped within the encapsulant and formed by deflagration of a sacrificial material, each channel having a respective inlet end and a respective outlet end, the network having at least one network inlet configured to direct fluid flow into the inlet ends and at least one network outlet configured to direct fluid flow away from the outlet ends, wherein at least one branch of each channel is positioned as being at least one of inside the central axial passage of at least one of the capacitors, around an outer periphery of at least one of the capacitors, and between at least two of the capacitors, and wherein each of the at least one network inlet and the at least one network outlet is configured for sealable engagement with the cooling fluid system.

2. A capacitor assembly according to claim 1, wherein the network of channels is formed by:
   forming a network of sacrificial components corresponding to the network of channels, the network of sacrificial components being positioned as at least one of within the encapsulant and on a surface of at least one of the first and second busbars;
   igniting the sacrificial components to cause deflagration of the sacrificial components, thereby forming the network of channels.

3. A capacitor assembly according to claim 1, wherein the network includes at least one manifold, each of the at least one manifold having at least one respective first inlet/outlet port and at least one respective second inlet/outlet port in fluid communication with the at least one first inlet/outlet port, wherein each of the at least one first inlet/outlet port is configured for sealable engagement with the cooling fluid system, and wherein each of the at least one second inlet/outlet port is in fluid communication with one of the at least one inlet end and at least one outlet end.

4. A capacitor assembly according to claim 1, wherein each channel has a respective channel wall wherein a respective first portion of at least one channel wall is formed by the encapsulant.

5. A capacitor assembly according to claim 4, wherein a second portion of the at least one channel wall is formed by a respective surface of one of the first and second busbars.

6. A capacitor assembly according to claim 1, further comprising a housing enclosing the plurality of capacitors, the respective major portions of the first and second busbars, and the encapsulant.

7. A capacitor assembly according to claim 1, further comprising a respective tube disposed within the respective central axial passage of each capacitor.

8. A capacitor assembly according to claim 7, wherein each respective tube is in fluid communication with the network of channels.

9. A capacitor assembly according to claim 1, wherein the at least one branch enters a respective central axial passage at a first respective end thereof and exits the respective central axial passage at one of the first respective end and a second respective end thereof.

10. A capacitor assembly according to claim 1, wherein the cooling fluid system is an electronic module having a surface configured for mounting the capacitor assembly thereon, at least two cooling fluid interfaces on the surface, and a cooling fluid supply and return system in fluid communication with the at least two cooling fluid interfaces, wherein each of the at least one network inlet and the at least one network outlet is configured for sealable engagement with a respective one of the at least two cooling fluid interfaces.

11. A vascular cooled capacitor assembly, comprising:
a plurality of capacitors, each capacitor having respective first and second leads and a respective central axial passage extending along at least a portion of a respective axial length thereof;
first and second busbars disposed in electrical contact with the first and second leads, respectively;
a housing enclosing the plurality of capacitors and a respective major portion of each of the first and second busbars;
an encapsulant filling at least a majority of free space within the housing; and
a network of channels formed by deflagration of a sacrificial material, each channel having a respective inlet end and a respective outlet end, the network having at least one network inlet configured to direct fluid flow into the inlet ends and at least one network outlet configured to direct fluid flow away from the outlet ends, wherein at least one branch of each channel is positioned as being at least one of inside the central axial passage of at least one of the capacitors, around an outer periphery of at least one of the capacitors, and between at least two of the capacitors, and wherein each of the at least one network inlet and the at least one network outlet is configured for sealable engagement with a cooling fluid system;
wherein the network of channels is formed by:
forming a network of sacrificial components corresponding to the network of channels, the network of sacrificial components being positioned as at least one of within the encapsulant and on a surface of at least one of the first and second busbars; and
igniting the sacrificial components to cause deflagration of the sacrificial components, thereby forming the network of channels.

12. A vascular cooled capacitor assembly according to claim 11, wherein the network includes at least one manifold, each of the at least one manifold having at least one respective first inlet/outlet port and at least one respective second inlet/outlet port in fluid communication with the at least one first inlet/outlet port, wherein each of the at least one first inlet/outlet port is configured for sealable engagement with the cooling fluid system, and wherein each of the at least one second inlet/outlet port is in fluid communication with one of at least one inlet end and at least one outlet end.

13. A vascular cooled capacitor assembly according to claim 11, wherein each channel has a respective channel wall wherein a respective first portion of at least one channel wall is formed by the encapsulant.

14. A vascular cooled capacitor assembly according to claim 13, wherein a second portion of the at least one channel wall is formed by a respective surface of one of the first and second busbars.

15. A vascular cooled capacitor assembly according to claim 11, wherein the cooling fluid system is an electronic module having a surface configured for mounting the capacitor assembly thereon, at least two cooling fluid interfaces on the surface, and a cooling fluid supply and return system in fluid communication with the at least two cooling fluid interfaces, wherein each of the at least one network inlet and the at least one network outlet is configured for sealable engagement with a respective one of the at least two cooling fluid interfaces.

16. A vascular cooled capacitor system, comprising:
a plurality of capacitors, each capacitor having respective first and second leads and a respective central axial passage extending along at least a portion of a respective axial length thereof;
first and second busbars disposed in electrical contact with the first and second leads, respectively;
a housing enclosing the plurality of capacitors and a respective major portion of each of the first and second busbars;
an encapsulant filling at least a majority of free space within the housing;
a network of channels formed by deflagration of a sacrificial material, each channel having a respective inlet end and a respective outlet end, the network having at least one network inlet configured to direct fluid flow into the inlet ends and at least one network outlet configured to direct fluid flow away from the outlet ends, wherein at least one branch of each channel is positioned as being at least one of inside the central axial passage of at least one of the capacitors, around an outer periphery of at least one of the capacitors, and between at least two of the capacitors; and
a cooling fluid system having a surface onto which the housing is mounted, at least two cooling fluid interfaces on the surface, and a cooling fluid supply and return system in fluid communication with the two cooling fluid interfaces, wherein each of the at least one network inlet and the at least one network outlet is sealably engaged with a respective one of the at least two cooling fluid interfaces.

17. A vascular cooled capacitor system according to claim 16, wherein the network of channels is formed by:

forming a network of sacrificial components corresponding to the network of channels, the network of sacrificial components being positioned as at least one of within the encapsulant and on a surface of at least one of the first and second busbars; and igniting the sacrificial components to cause deflagration of the sacrificial components, thereby forming the network of channels.

18. A vascular cooled capacitor system according to claim 16, wherein the network includes first and second manifolds each having at least one respective first inlet/outlet port and at least one respective second inlet/outlet port, each of the at least one first inlet/outlet port is sealably engaged with a respective one of the at least two cooling fluid interfaces, and each of the at least one second inlet/outlet port is in fluid communication with one of at least one inlet end and at least one outlet end.

19. A vascular cooled capacitor system according to claim 16, wherein each channel has a respective channel wall wherein a respective first portion of at least one channel wall is formed by the encapsulant.

20. A vascular cooled capacitor system according to claim 19, wherein a second portion of the at least one channel wall is formed by a respective surface of one of the first and second busbars.

\* \* \* \* \*